United States Patent [19]

Celi

[11] Patent Number: 4,828,661

[45] Date of Patent: May 9, 1989

[54] PROCESS FOR RECOVERY OF METALS FROM METAL/PLASTIC WASTE

[76] Inventor: Antonio M. Celi, Im Engelsgarten 2, D-5466 Neustadt, Fed. Rep. of Germany

[21] Appl. No.: 131,765

[22] Filed: Dec. 11, 1987

[30] Foreign Application Priority Data

Sep. 24, 1987 [DE] Fed. Rep. of Germany ....... 3732177

[51] Int. Cl.$^4$ ............................ C25C 1/20; C25F 5/00; C22B 3/00
[52] U.S. Cl. .................................... 204/109; 204/130; 204/149; 204/141.5; 75/101 BE; 75/115; 423/45; 210/685; 210/688
[58] Field of Search ............... 75/101 R, 101 BE, 103, 75/115, 118 R, 121; 423/22, 24, 27, 32, 45, 112, 131; 204/149, 130, 105 R, 141.5, 109; 210/685, 688

[56] References Cited

U.S. PATENT DOCUMENTS

| | | | |
|---|---|---|---|
| 3,922,231 | 11/1975 | Carlin et al. ....................... | 423/22 X |
| 4,069,110 | 1/1978 | Baboian et al. ................... | 204/141.5 |
| 4,107,011 | 8/1978 | Kucherenko et al. ........... | 204/149 X |
| 4,118,295 | 10/1978 | Korenowski .................... | 204/149 X |
| 4,252,621 | 2/1981 | Reinhardt et al. .......... | 75/101 BE X |
| 4,374,008 | 2/1983 | Natansohn et al. ......... | 75/101 Be X |
| 4,652,352 | 3/1987 | Saieva ................................. | 204/149 |

Primary Examiner—Donald R. Valentine
Attorney, Agent, or Firm—W. Thad Adams, III

[57] ABSTRACT

The invention relates to a process for recovery of metals from metal/plastic waste using used etching and washing solutions from the electronics industry, with the following process steps:

(a) heating of the metal/plastic waste in a heating bath in order to separate the metal from the plastic;
(b) dissolution of the metal component in the optionally regenerated etching and washing solutions;
(c) conversion of the dissolved metal component into the sulfate through treatment with ion exchanger;
(d) electrolytic deposition and, if appropriate, selective separation of the metal component into the individual metals, and
(e) regeneration of the ion exchanger with reformation of the reusable etching solution.

8 Claims, No Drawings

PROCESS FOR RECOVERY OF METALS FROM METAL/PLASTIC WASTE

The present invention relates to the recovery of metals from waste products, in particular from metal/plastic waste and the like, produced in industry in extraordinarily large amounts.

Thus, enormous amounts of metal-coated plastic waste are produced, for example, in packaging of medicaments; this waste has hitherto been transported to dumps and stored there.

However, recent investigations have shown that, during rotting of this waste on these dumps, temperatures of greater than 120° C. are produced, and at these temperatures dioxin-containing decomposition products, inter alia, also form, which represent an extraordinary hazard to the environment.

In addition, enormous amounts of metal, in particular copper-coated plastic waste which, even through the copper content alone, have an extraordinarily high value which alone justifies reprocessing, quite apart from the environmental problems caused by the storage of such waste in dumps, are produced in the electronics industry, in particular in the production of circuit boards.

In addition, large amounts of so-called computer waste, which is distinguished by a high content of copper, tin, noble-metal contacts and the like, are produced during further development of computers and other electronic instruments.

In the production of circuit boards, so-called etching solutions, which, in the used state, have a relatively high content of copper (generally 120 to 150 g per liter), are used in the electronics industry. Quite apart from the fact that this high copper content alone justifies processing of these etching solutions for economic reasons, the solutions also, on the other hand, represent great environmental pollution if they are discharged into the sewage system. Reprocessing of these etching solutions is therefore absolutely necessary.

The present invention relates specifically to the recovery of metals from metal/plastic waste of the type outlined above, and at the same time the used etching solutions produced in large amounts in the electronics industry are also used and worked up.

The process, according to the invention, for recovery of metals from metal/plastic waste and the like is therefore carried out using used etching and washing solutions from the electronics industry and comprises the following process steps:

(a) heating of the metal/plastic waste in a heating bath in order to separate the metal from the plastic;

(b) dissolution of the metal component in the etching and washing solutions;

(c) conversion of the dissolved metal component into the sulfate through treatment with ion exchanger;

(d) electrolytic deposition and, if appropriate, selective separation of the metal component into the individual metals;

(e) regeneration of the ion exchanger using dilute sulfuric acid while reforming the etching solution, which can be reused if desired.

The heating of the metal/plastic waste carried out in process step (a) can in principle be carried out in various ways, for example in an air bath, but preferably in a heat-transfer medium bath, a high-temperature-stable organic liquid, for example the product obtainable under the tradename Marlotherm S, with which heating of the metal/plastic waste into the region of 350° C. is possible without difficulties, expediently being used as heat-transfer medium.

This heat treatment firstly breaks the bond between the metal on the one hand and the plastic on the other hand, and in addition likewise breaks all soldering connections, for example in computer scrap, since the tin used for the connection melts and collects at the base.

In addition, if the treatment temperature is sufficiently high, the heat-treatment causes the plastic material to melt, clump together and form a plastic block on cooling. This plastic block can be reused for the production of plastic articles after appropriate granulation.

The metals molten at the heat-treatment temperature can be obtained through decantation, and the metals, such as copper, aluminum, silver, nickel, chromium and also the noble metals gold and platinum, which were used, in particular, in contacts of switches, relays etc., freed from the plastic can be separated mechanically from the heat-transfer medium solution.

The metals obtained mechanically in this fashion are then brought into contact in the next step with the etching and washing solutions and dissolved therein.

The etching and washing solutions generally comprise ammonium chloride, sodium chloride and/or sodium sulfate and frequently contain, in addition, significant amounts of hydrogen peroxide. Dissolution of the abovementioned metals in these solutions is therefore not a problem.

After complete dissolution of the metal component, conversion into the sulfate is carried out by treatment with an ion exchanger.

The latter introduces sulfate ions into the solution and in exchange takes up the other anions present, so that, in the end, the metals are all present in sulfate form.

The solution pre-treated in this fashion is then subjected to electrolytic deposition of the metals, in which, if appropriate, selective separation of the metal component into the individual metals takes place at the same time.

The ion exchanger is regenerated using dilute sulfuric acid while reforming the reusable etching solution, so that it can itself likewise be reemployd.

It has proven expedient if the noble metals, such as, for example, gold and platinum, are obtained directly from the metal component dissolved in the etching and washing solutions through exchange with a cation exchanger.

In the same fashion, the aluminum contained in the metal component can also be obtained in an advantageous fashion through cation exchange.

All other metals can be recovered selectively in purest form through electrolysis. Due to their high purity, they can be reused for practically all purposes.

The heat-transfer medium used in the process according to the invention is circulated and always reused. An inert gas blanket prevents oxidation of the heat-transfer medium.

The ion exchanger (anion exchanger) used in the process can likewise always be reused after it has been appropriately regenerated using dilute sulfuric acid.

The work-up, according to the invention, of metal/plastic waste with recovery of all metal components and the plastic component thus takes place with simultaneous work-up of the etching and washing solutions produced in the electronics industry, only dilute sulfuric acid needing to be intorduced into the process in order to regenerate the ion exchanger resin. However, even this component can be recovered in the electrolysis process if this step is controlled appropriately.

The process according to the invention, which can be carried out continuously, thus allows, in an optimum fashion, work-up of metal-coated plastic waste on the one hand, and etching and washing solutions produced in the electronics industry on the other hand, useful raw materials being recovered in purest form.

Besides the waste substances mentioned initially, metal-containing slurries from the anodizing, electroplating, chemical and electronics industries can also be worked up in the process according to the invention. These slurries are expediently dissolved in the etching and washing solutions, expediently regenerated, together with the metal component which has been freed from plastic, and the mixtures are worked up alone or, if appropriate, together with the metal component from the metal/plastic waste.

A further difficult waste material is used instrument batteries, which can likewise be processed for their metal components in the process according to the invention.

The batteries are expediently cut open, freed from their plastic component and then likewise dissolved in the etching and washing solution, expediently regenerated, and worked up in the same fashion as the metals from the metal/plastic waste.

The process according to the invention is described in greater detail with reference to the illustrative embodiment described below.

ILLUSTRATIVE EMBODIMENT

Computer scrap is introduced into a heat-transfer medium bath (Marlotherm S), which is heated to a temperature of 270° to 280° C., and left therein until the contact points, comprising solder tin, of the assembly circuit boards have melted and the plastic sheaths around the assemblies have disappeared.

The solder tin collects at the base of the heat-transfer medium bath and is removed therefrom from time to time.

The metal parts liberated in this fashion are transferred into an etching bath, preferably regenerated, comprising etching and washing solutions from the electronics industry. During this procedure, this etching bath is operated at a suitable concentration and at a suitable temperature. It contains the following etches: ammonium chloride, sodium sulfate and hydrogen peroxide.

All metals, such as copper, chromium, nickel, cadmium, zinc, aluminum, gold, silver and also mercury, are dissolved in this etching bath.

The solution prepared in this fashion is initially treated with an ion exchanger resin in order to eliminate the noble metals and the mercury. The subsequent ion exchanger treatments prepare the recovery of all the metals contained in the solution by means of a multistage electrolysis. To this purpose, the metals are converted into the sulfate form and selectively deposited with high purity in a fashion which is known per se through multistage electrolysis.

The individual treatment steps of the process according to the invention are carried out batchwise, it being possible to vary the duration of the individual steps by controlling the temperature.

The ion exchanger resin is regenerated using dilute sulfuric acid, so that the ion exchanger resin can be reemployed in order to convert the metals contained in the etching agent into the sulfate form.

The etching agent, which is reemployed in the process according to the invention after regeneration, can on the other hand, also be reemployed in the electronics industry for the production of circuit boards, either as a ready-to-use solution or, in evaporated form, as a solid salt mixture which is diluted before use at the place of use to the solution desired.

The economic efficiency on the one hand and the environmental acceptability on the other hand of the process according to the invention is achieved here by the fact that a wide range of extraordinarily difficult waste materials from different branches of industry can be worked up continuously without pollution and inexpensively using a specific etching agent which is circulated and which is likewise produced as a waste product in the electronics industry, at the same time recovering inaudible valuable metals in an environmentally acceptable and inexpensive manner.

I claim:

1. A process for recovery of metals from metal/plastic component waste, wherein the process is carried out using used etching and washing solutions from the electronics industry and comprises the following process steps:
    (a) heating of the metal/plastic waste in a heating bath in order to separate the metal component from the plastic component;
    (b) dissolving the metal component in the etching and washing solutions;
    (c) converting the dissolved metal component into the sulfate form of the metal through treatment with an ion exchanger;
    (d) electrolytically depositing and, if appropriate, selectively separating the metal component into the individual metals; and
    (e) regenerating the ion exchanger using dilute sulfuric acid while reforming the reusable etching solution.

2. The process as claimed in claim 1, wherein the heating of the metal/plastic waste is carried out in an organic heat-transfer medium bath.

3. The process as claimed in claim 1 or 2, wherein the metal/plastic waste is heated to above the melting point of the plastic, and the latter is then separated from the heat-transfer medium by cooling.

4. The process as claimed in claim 2 or 3, wherein metals melting in the heat-transfer medium bath are removed by decantation.

5. The process as claimed in claims 1 or 2, wherein the etching and washing solutions used for dissolution of the metal component contain an oxidant.

6. The process as claimed in claim 5, wherein the etching and washing solutions used contain hydrogen peroxide.

7. The process as claimed in claim 1, wherein he metal component includes gold or platinum and the gold or platinum contained in the etching and washing solutions from step (b) are recovered through exchange using a cation exchanger.

8. The process as claimed in claim 1, wherein the metal component includes aluminum and the aluminum contained in the etching and washing solutions from step (b) is recovered through exchange using a cation exchanger.

* * * * *